(12) United States Patent
Hennemann et al.

(10) Patent No.: US 11,219,911 B2
(45) Date of Patent: Jan. 11, 2022

(54) DEVICE FOR DISPENSING LIQUID-TO-PASTY PRODUCTS AND MODULE-FORMING CLOSURE DEVICE THEREFOR

(71) Applicant: PROMENS SA, Bellignat (FR)

(72) Inventors: Pascal Hennemann, Vaux les Saint Claude (FR); Joey Kurtz, Wasselonne (FR)

(73) Assignee: PROMENS SA, Bellignat (FR)

( * ) Notice: Subject to any disclaimer, the term of this patent is extended or adjusted under 35 U.S.C. 154(b) by 0 days.

(21) Appl. No.: 16/649,204

(22) PCT Filed: Oct. 11, 2018

(86) PCT No.: PCT/FR2018/052531
§ 371 (c)(1),
(2) Date: Mar. 20, 2020

(87) PCT Pub. No.: WO2019/073180
PCT Pub. Date: Apr. 18, 2019

(65) Prior Publication Data
US 2020/0384491 A1 Dec. 10, 2020

(30) Foreign Application Priority Data

Oct. 12, 2017 (FR) .................................... 1759572
Nov. 6, 2017 (FR) .................................... 1760380

(51) Int. Cl.
*B05B 11/00* (2006.01)
*A45D 34/00* (2006.01)
(Continued)

(52) U.S. Cl.
CPC .......... *B05B 11/3035* (2013.01); *A45D 34/00* (2013.01); *A45D 40/00* (2013.01);
(Continued)

(58) Field of Classification Search
CPC ............ B05B 11/3035; B05B 11/0067; B05B 11/0072; B05B 11/3036; B05B 11/3061;
(Continued)

(56) References Cited

U.S. PATENT DOCUMENTS 3,889,628 A * 6/1975 Usab ..................... B05C 17/002
118/711
4,033,487 A 7/1977 Micallef
(Continued)

FOREIGN PATENT DOCUMENTS

EP 1449595 A1 8/2004
FR 2976981 A1 12/2012
(Continued)

OTHER PUBLICATIONS

International Search Report for corresponding application PCT/FR2018/052531 filed Oct. 11, 2018; dated Jan. 28, 2019.

*Primary Examiner* — Charles P. Cheyney
(74) *Attorney, Agent, or Firm* — Cantor Colburn LLP

(57) ABSTRACT

The present invention relates to a modular closure device (7) for a device for dispensing a product, comprising: —an outlet nozzle (9) comprising: an outlet orifice (15) at the front, a rear opening, a product intake orifice, —top valve comprising a shut-off member (17) that closes of the outlet orifice, a deformable membrane (22) that seals the rear opening closed, designed so that a depression inside the nozzle forces the shut-off member toward its closed position, and a rigid frame extending between the outlet orifice and the membrane; —a bell housing having an end wall and base opening opposite this end wall, the edges of the base opening being fixed to the nozzle, the membrane sealing the base opening closed. The invention also relates to a dispensing device comprising this closure device.

11 Claims, 7 Drawing Sheets

(51) Int. Cl.
*A45D 40/00* (2006.01)
*G01F 11/08* (2006.01)

(52) U.S. Cl.
CPC ...... *B05B 11/0067* (2013.01); *B05B 11/3074* (2013.01); *G01F 11/08* (2013.01); *A45D 2200/056* (2013.01)

(58) Field of Classification Search
CPC ..... B05B 11/3074; A45D 34/00; A45D 40/00; A45D 2200/056; G01F 11/08
USPC .......... 222/207, 212, 209, 321.7, 383.1, 380
See application file for complete search history.

(56) References Cited

U.S. PATENT DOCUMENTS

| | | | | |
|---|---|---|---|---|
| 4,913,322 | A * | 4/1990 | Stoffler | B05B 11/00416 222/207 |
| 5,429,275 | A * | 7/1995 | Katz | B05B 11/0075 222/108 |
| 5,819,990 | A * | 10/1998 | Cimentepe | B05B 11/3036 222/207 |
| 5,860,567 | A * | 1/1999 | Fuchs | B05B 11/3036 222/105 |
| 6,712,243 | B2 * | 3/2004 | Rossignol | B05B 11/00418 222/207 |
| 7,793,803 | B2 * | 9/2010 | Neerincx | B05B 11/3033 222/207 |
| 8,360,284 | B2 * | 1/2013 | Carta | B05B 11/3028 222/207 |
| 9,079,206 | B2 * | 7/2015 | Doulin | B05B 11/3035 222/207 |
| 10,315,209 | B2 * | 6/2019 | Presche | B05B 11/306 |
| 2008/0017666 | A1 * | 1/2008 | Vanblaere | B05B 11/3077 222/135 |
| 2008/0264975 | A1 * | 10/2008 | Bruder | B05B 11/0067 222/321.3 |
| 2010/0187261 | A1 * | 7/2010 | Wochele | B05B 11/0005 222/207 |
| 2014/0231463 | A1 * | 8/2014 | Goettke | B05B 11/3001 222/321.7 |

FOREIGN PATENT DOCUMENTS

| | | |
|---|---|---|
| JP | 752980 A | 2/1995 |
| NL | 6918423 A | 6/1971 |

* cited by examiner

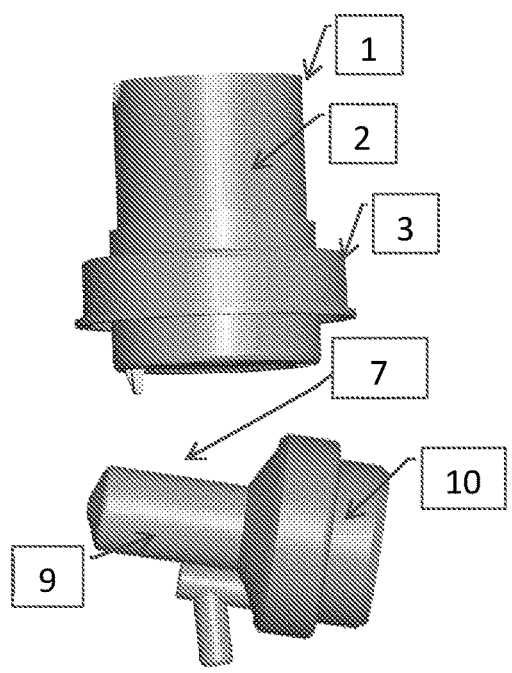
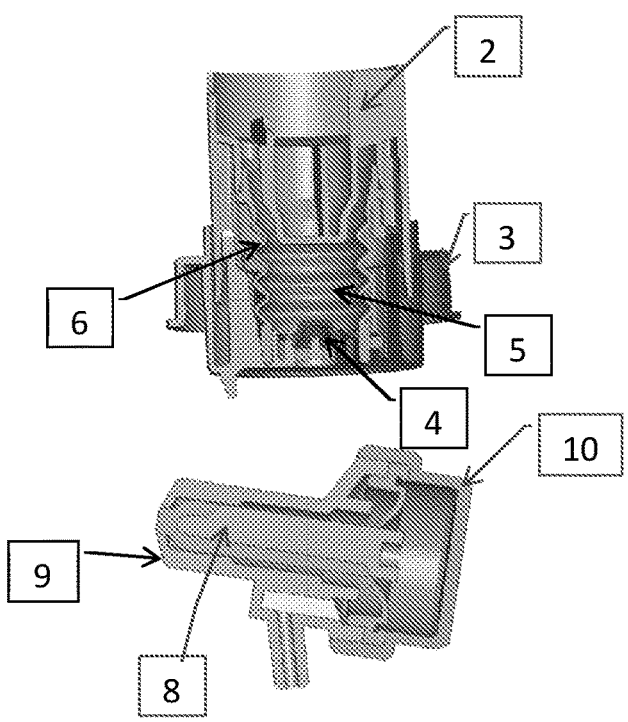
Fig. 1
Fig. 2
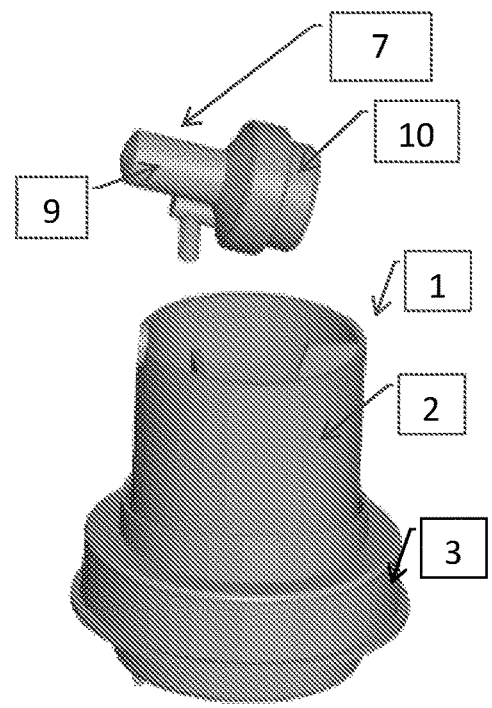
Fig. 3

DEVICE FOR DISPENSING LIQUID-TO-PASTY PRODUCTS AND MODULE-FORMING CLOSURE DEVICE THEREFOR

TECHNICAL FIELD

The present disclosure relates to the field of devices for dispensing a liquid-to-pasty product to be dispensed, in particular a cream, an ointment or a paste, in particular for cosmetic use.

BACKGROUND

FR2976981A1 describes a device for closing a pump with two valves having a top valve for closing the hole in the outlet nozzle of the push button. This top closure valve works with a pressure difference on either side of the fixed membrane which separates the interior of the pump from the exterior. When the internal pressure is higher than the external pressure, the membrane deforms and causes the top valve to retract, thereby opening the outlet hole in the nozzle.

This is what happens when the pump is activated by pressing the push button; pressure is generated inside the pump, which opens the top valve and allows the product to exit. When the push button rises back up, it generates a weaker depression inside the pump, this depression being necessary to suck the product contained in the container into the metering chamber, which causes the reverse deformation of the membrane of the top valve, which moves forward, closing the outlet hole in the nozzle.

With this membrane alone, there is a risk of this operation being disrupted when the system is subjected to a lower external pressure, for example in aircraft cabins or in the mountains, which in this case causes inopportune, involuntary opening of the push button outlet hole because the pressure inside the system is then higher than the external pressure.

To overcome this problem, FR2976981A1 adds, to the rear of the top valve, a bell which is sealed closed making it possible to maintain a stable and constant pressure behind the membrane of the top valve, which avoids any inopportune opening in the event of a slight depression outside the system.

However, the device of FR2976981A1 requires a closed bell at the rear of the top valve; this is a complex system to assemble and the movement of the membrane of the top valve takes place in a closed bell of small volume, which limits the movement for opening the top valve. To be specific, when it moves in the bell, the top valve creates an overpressure inside the sealed bell, which limits its opening.

BRIEF SUMMARY

The aim of the present disclosure is to overcome the functioning problems found in the prior art cited above.

To this end, the disclosure firstly relates to a closure device intended to be mounted in a device for dispensing a liquid-to-pasty product to be dispensed, said closure device forming a module consisting of:
  an outlet nozzle comprising a cavity and outer walls delimiting this cavity, these outer walls having several through-holes and through-openings: an outlet hole at the front of the nozzle, a rear opening, and an intake hole intended to be connected to a metering chamber of a pump motor of the dispensing device,
  a top valve composed only of:
    a shut-off member, arranged inside the cavity and movable between a forward position in which it closes off the outlet hole and a retracted position in which it uncovers this outlet hole,
    a deformable membrane which closes the rear opening in a sealed manner and which is rigidly secured to the shut-off member, and
    a rigid skeleton extending between a first end closing off the outlet hole in said forward position and a second end bearing the membrane,
  a bell having an end wall and a base opening opposite this end wall, the edges of the base opening being attached to the nozzle, the membrane also closing the base opening in a sealed manner.

According to the disclosure, in this closure device, the membrane has flexibility and the closure device is arranged in such a way that a depression inside the cavity causes deformation of the membrane toward the interior of the cavity, so that the membrane then pushes the shut-off member into the forward position.

According to the disclosure, in particular according to the above paragraph, the closure device may form a module consisting of only these parts: the nozzle, a top valve, and the bell. In other words, there are only three separate parts assembled to one another. To be specific, in this case the top valve forms a single piece as regards the assembly of the module, since the shut-off member and the membrane are rigidly secured to one another by the skeleton, thus forming a one-piece element to be assembled with the nozzle and the bell.

According to the disclosure, the top valve may be composed only of the membrane and the shut-off member, rigidly secured by the skeleton.

Thus, a simplified autonomous module is obtained, which can be coupled to a pump motor of a dispensing device, thus simplifying the assembly of the latter. In particular, the closure device can be mounted inside a push button rigidly secured to the pump motor.

Production is especially simplified as the dispensing device requires only a bottom valve for the intake of product into the metering chamber, the shut-off member and the membrane forming the top valve of the dispensing device in which the closure device will be mounted. This closure device therefore allows the assembly of a dispensing device with only two valves, the top valve of which is included in this closure device.

Furthermore, this closure device closes in the event of a depression in the cavity, under the very effect of this depression, and hence without having to use a powerful spring to perform this action, or indeed without the use of a spring. For example, when the closure device is mounted in a dispensing device with a pump motor, when the liquid is sucked into the metering chamber, in particular when the push button is released, the cavity goes into depression, which causes the outlet hole to close.

Moreover, despite simple assembly of the module, it nevertheless still affords good guidance of the shut-off member and good transmission of the closing force from the membrane to the shut-off member, in particular to its end for closing the outlet hole, by virtue of the skeleton.

Note that the first end can close the outlet hole in said forward position indirectly, the portion of the shut-off member closing this outlet hole being directly in the extension thereof, the first end thus pressing the shut-off member in closure on the outlet and hence closing the latter via this portion. In particular, the first end is at a base of the nipple, this nipple extending between its base at a free end of the nipple.

The closure device according to the disclosure may optionally include one or more of the following features, individually or in combination:

- the edges of the base opening are attached to the nozzle in such a way that the bell and the nozzle grip the edges of the membrane tightly; this is a simple way to assemble the membrane to the nozzle and to the bell while separating them in a sealed manner;
- the membrane is made of a flexible material bi-injection molded on said skeleton; this makes it possible to produce the top valve even more integrally, as a single piece;
- the shut-off member is arranged so as to forcibly enter the outlet hole when the membrane pushes the shut-off member into said forward position;
- the shut-off member has a radially compressible flexible end;
- the shut-off member lies flush with the exterior surface of the nozzle at the edge of the outlet hole;
- the bell also has at least one vent communicating between the interior and the exterior of the bell;
- the top valve comprises a flexible coating bi-injection molded on the skeleton, this coating covering a first end of the skeleton so as to form a nipple and extending to the second end of the skeleton, forming the membrane substantially transversely to the longitudinal axis of the skeleton; thus, the nipple may form the portion of the shut-off member that directly closes off the outlet; this also makes it possible to reinforce the cohesion of the top valve as a single piece;
- this coating extends to the second end of the skeleton, forming a cup substantially transverse to the longitudinal axis of the skeleton, the cup forming the membrane;
- the membrane is elastic so as to generate, when it deforms, an elastic return force at the flexible membrane, when its surface is stressed by differences in pressure on either side of the membrane;
- the closure device does not include means for returning the shut-off member to the forward position, other than the membrane.

The disclosure also relates to a device for dispensing a liquid-to-pasty product, comprising:

- a pump motor with a metering chamber,
- a bottom valve for opening or closing the inlet to this chamber,
- a housing,
- a closure device according to the disclosure, housed in the housing, and arranged in such a way that the intake hole is in communication with the interior of the metering chamber.

The dispensing device according to the disclosure may optionally include one or more of the following features, individually or in combination:

- the housing is open at the top so that the closure device is mounted from above in the housing;
- the pump motor includes:
  - a push button, in which the housing is formed, and
  - a cap covering the closure device at the top and closing the housing;
- the dispensing device comprises a connecting member for connection to a container of liquid-to-pasty product, and in this dispensing device, the pump motor further comprises:
  - a push button that can move relative to the connecting member between a bottom position and a top position,
  - a piston fixed relative to the connecting member, the piston comprising a top opening communicating on one side with the interior of the metering chamber and being intended on the other side to be in communication with the contents of the container,
  - a flexible pouch delimiting the metering chamber laterally, attached at the top to the push button and at the bottom to the piston,
  - an elastic return means arranged in such a way that its stress increases when the push button moves into its bottom position,
- the flexible pouch and the piston being arranged in such a way that when the push button is in the top position, the flexible pouch is arranged above the piston, in such a way that when the push button descends to the bottom position, the flexible pouch collapses on the piston, causing an increase in pressure in the metering chamber, and in such a way that when the push button rises to the top position, the flexible pouch expands above the piston, causing a decrease in pressure in the metering chamber, the bottom valve being arranged in such a way as to open or close the chamber inlet under the effect of a decrease in pressure or an increase in pressure, respectively, in the metering chamber;
  - this is a simple embodiment making it possible in particular to reduce dead volumes;
  - the flexible pouch is arranged in such a way that it collapses while turning in on itself, its side walls then furling around the piston; the pouch may thus have a very simple shape;
  - the flexible pouch is connected to the bottom valve so as to delimit therewith the end wall of the metering chamber; this further simplifies the production of the pouch;
  - the flexible pouch and the bottom valve form a single one-piece part made of a single material; the production of the device is even further simplified;
  - the flexible pouch has an end wall pierced with an inlet orifice, which is arranged in such a way as to press and close against a portion of the piston offset with respect to the top opening, under the effect of an increase in pressure in the metering chamber, and to move away therefrom under the effect of a decrease in pressure in the metering chamber; thus, the portion of the end wall of the pouch around the inlet orifice forms the bottom valve; when this portion of the end wall moves away from the piston, a passage is then opened up between the top opening and the inlet orifice; this is a very simple embodiment in which, thanks to a simple hole, the pouch forms both the side walls and the end wall of the metering chamber, as well as the bottom valve;
  - the end wall of the flexible pouch has one or more attachments to the piston, these attachments being distributed around an area surrounding the inlet orifice and the top opening; this makes it possible to form an articulation of the edges of the inlet orifice, the portion of the end wall between these attachments and comprising the inlet orifice thus forms the bottom valve; these attachments may in particular be protrusions projecting from the underside of the end wall of this pouch;
  - the elastic return means is a coil spring arranged around the piston and the flexible pouch and gripped tightly between the push button and the connecting member; this is a compact embodiment;

the flexible pouch is open at the top, and comprises a neck delimiting the opening in the flexible pouch, the neck being pinched between a wall of the push button and an attachment ring, this wall forming the ceiling of the metering chamber; this simplifies the mounting of the flexible pouch;

the flexible pouch may in particular be made of a flexible material with a shore A hardness of between 30 and 90 and/or a thermoplastic elastomer;

the dispensing device according to the disclosure is designed to deliver doses of product of from 0.20 milliliters (ml) to 5.0 ml; the device is particularly suitable for such doses.

In the present application, the terms "top" and "bottom", "upper" and "lower", and "front" and "rear" are applied according to the orientation of the various elements as they are shown in FIGS. 1 to 7 and 9 to 15.

BRIEF DESCRIPTION OF THE FIGURES

Further features and advantages of the disclosure will appear on reading the detailed description of the following non-limiting examples, for the understanding of which reference will be made to the appended drawings, in which:

FIG. 1 is a side view of a pump motor and a closure device according to a first exemplary embodiment of the disclosure, before they are fitted together to form a dispensing device according to a first exemplary embodiment; the closure device is in this case depicted on a larger scale than the pump motor;

FIG. 2 is a vertical section through the elements of FIG. 1;

FIG. 3 shows the elements of FIG. 1 but on the same scale, the closure device being ready to be positioned, from above, in a dedicated housing in the pump motor;

DETAILED DESCRIPTION

Figure 4:
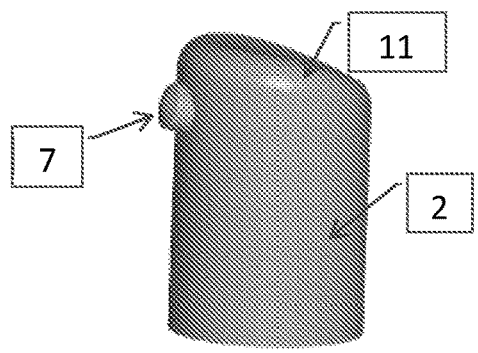
FIG. 4 shows the dispensing device of the previous figures assembled with a push button cap.

FIGS. 1 to 4 depict a first exemplary embodiment of a dispensing device according to the disclosure. In this case, this dispensing device is a cosmetic product dispensing pump composed of:

a pump motor assembly 1 with a push button 2, a connecting member, in this case a connection ring 3, on the container containing the cream (this container is not shown), a bottom valve 4, a metering chamber 5 and a return means 6 in the form of an elastically deformable bellows;

a first exemplary embodiment of a closure device 7 according to the disclosure, in this case in three parts comprising a top valve 8, an outlet nozzle 9 and a bell 10 for non-leaktight attachment of the top valve, this closure device 7 being in this case assembled vertically above the push button;

a covering cap 11 for covering the push button 2.

According to the disclosure, as in this case, the assembly forms a cosmetic pump with two valves, with a portion of the closure device, namely the end of the nozzle 9 and its outlet hole 15, projecting out of the dispensing device.

The connection ring 3 allows the connection between the container containing the product and the motor of the pump 1.

This connecting member may be made of plastic, preferably polypropylene, or according to another production process, may be molded in two materials by bi-injection molding, for example the first injection being polypropylene, and the second injection producing a seal injected to improve the leaktight connection with the container.

Figure 5:
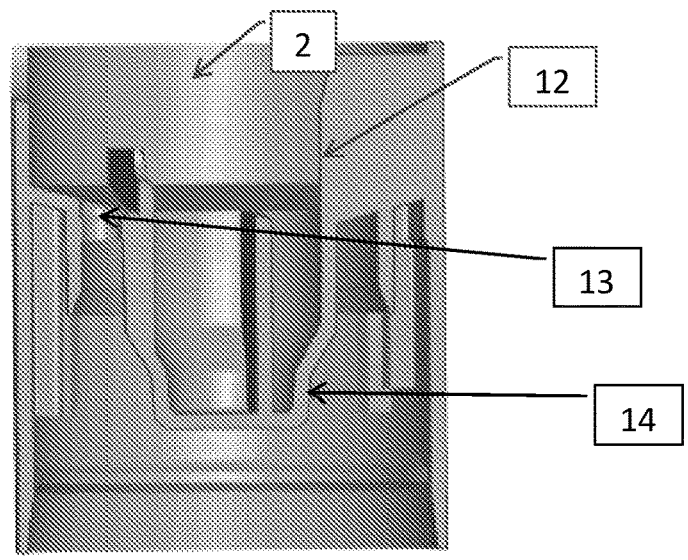
FIG. 5 shows one of the elements isolated from FIG. 2, in this case the push button.

According to the disclosure, as in this example and as depicted in FIG. 5, the push button 2 may be open at the top and at the bottom with a partition wall 12 comprising a connection channel 13 and a dead volume reducer 14 interacting, as depicted in FIG. 2, on one side with the metering chamber 5 and on the other side with the closure device 7.

According to the disclosure, as in this case, this push button 2 may be made as a single one-piece part. Preferably, but not exclusively, the push button 2 is molded from polypropylene.

As can be seen in FIG. 2, the bellows 6 incorporates the bottom valve 4, the metering chamber 5 and accordion-like side walls, these walls on the one hand thus delimiting the metering chamber, and on the other hand forming an elastic return member for returning the bellows from a compressed configuration to an expanded configuration.

This bellows may, for example as in this case, be molded from a single material, in particular polyethylene, preferably but not exclusively an ultra-low-density polyethylene (ULDPE).

The metering chamber 5 in this case interacts with the volume reducer 14 of the push button 2.

According to the disclosure, the closure device 7 incorporates in a single module:

the outlet nozzle 9
the top valve 8
the attachment bell 10.

As can be seen in FIGS. 1 to 3, this module is assembled into a single assembly separately from the rest of the dispensing device.

Figure 6:
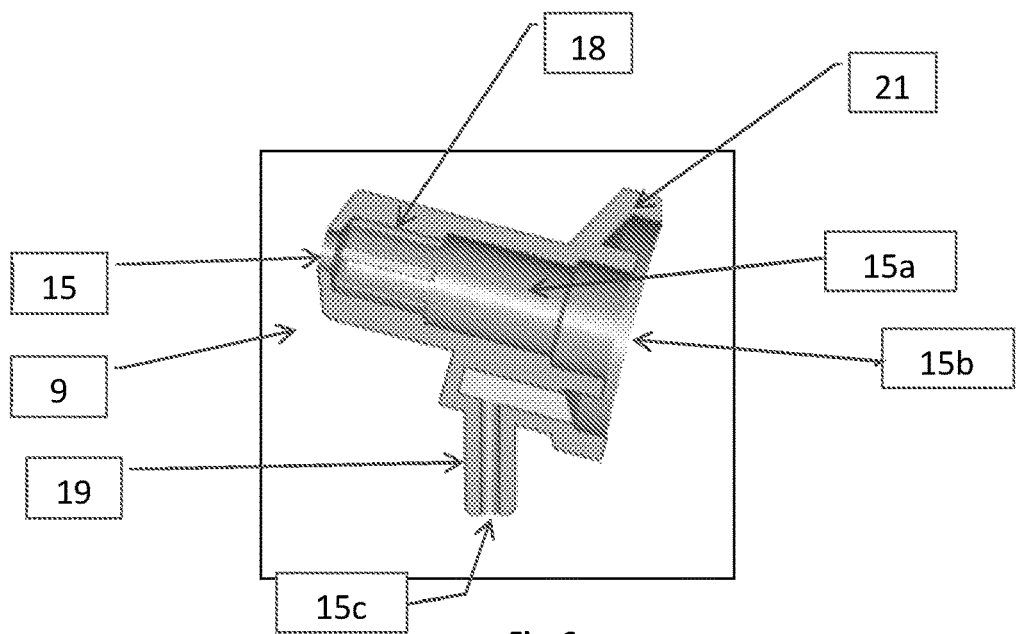
FIG. 6 shows one of the elements isolated from FIG. 2, in this case the outlet nozzle.

The outlet nozzle 9, depicted in FIG. 6, comprises walls delimiting a cavity 15a.

According to the disclosure, as in this example, the nozzle 9 may be made as a single one-piece part, in particular made integrally in one piece.

According to the disclosure, as in this case, this nozzle 9 may comprise only three orifices communicating with the outside of the nozzle 9: the outlet hole 15 at the front of the nozzle, a rear opening 15b and an intake hole 15c for intaking product, for example cream.

Figure 7:
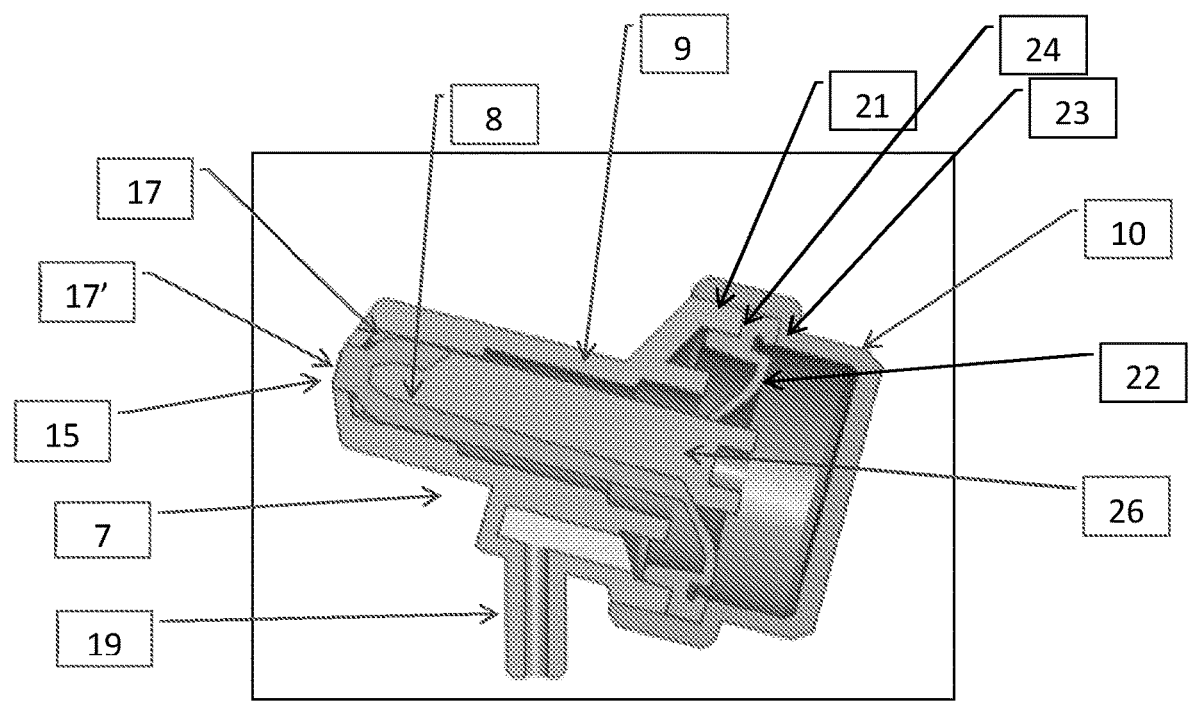
FIG. 7 depicts the closure device of FIG. 2 taken in isolation.

As in this case, the nozzle 9 may include:

the outlet hole 15 for the product, interacting in the closed position of this hole with a first end 17 of the top valve 8, this first end thus forming a shut-off member 17 for the outlet hole 15, guide means 18 for guiding the top valve 8, in particular the shut-off member 17, in this case a sliding guide, a connection tube 19 for interacting with the connection channel 13 of the push button 2, visible in FIG. 5, to allow the cream to pass from the metering chamber 5 into the closure device 7, entering through the intake hole 15c, a means 21 for attaching the attachment bell 10 which, as depicted in FIG. 7, makes it possible to close the rear opening 15b, by sealed clamping of the membrane 22 of the top valve 8, in particular of the edges thereof, between a stop 23 of the attachment bell 10 and a stop 24 of the nozzle 9.

As depicted in FIG. 7, the top valve 8 comprises a rigid part 26, which serves as a rigid skeleton, and flexible parts, namely in this case a nipple 17' located at the front of the top valve 8, and the membrane 22, which is in this case elastic, located at the rear of the top valve 8.

In this case, the top valve 8 thus performs the following functions:

a function of sealing, at the nipple at the end 17 of the top valve 8, with the hole 15 in the outlet nozzle 9;

a function of sealing, at the flexible membrane 22 of the top valve 8, between the stop 24 of the outlet nozzle 9 and between the stop 23 of the attachment bell 10, thus ensuring a sealed closure of the rear opening 15b;

a function of elastic deformation and elastic return, at the flexible membrane 22, and also a function of return when its surface is stressed by pressure differences on either side of the membrane 22.

In this case, the top valve 8 is molded by bi-injection molding, first injecting the rigid skeleton 26, which is molded, preferably but not exclusively, from polypropylene and then injecting the flexible parts forming the nipple 17' and the membrane 22, which are molded, preferably but not exclusively, from thermoplastic elastomer (or TPE).

According to the disclosure, preferably but not exclusively, the nipple 17' and the membrane 22 are made of a TPE with a shore A hardness of between Shore 30A and Shore 70A.

Figure 9:
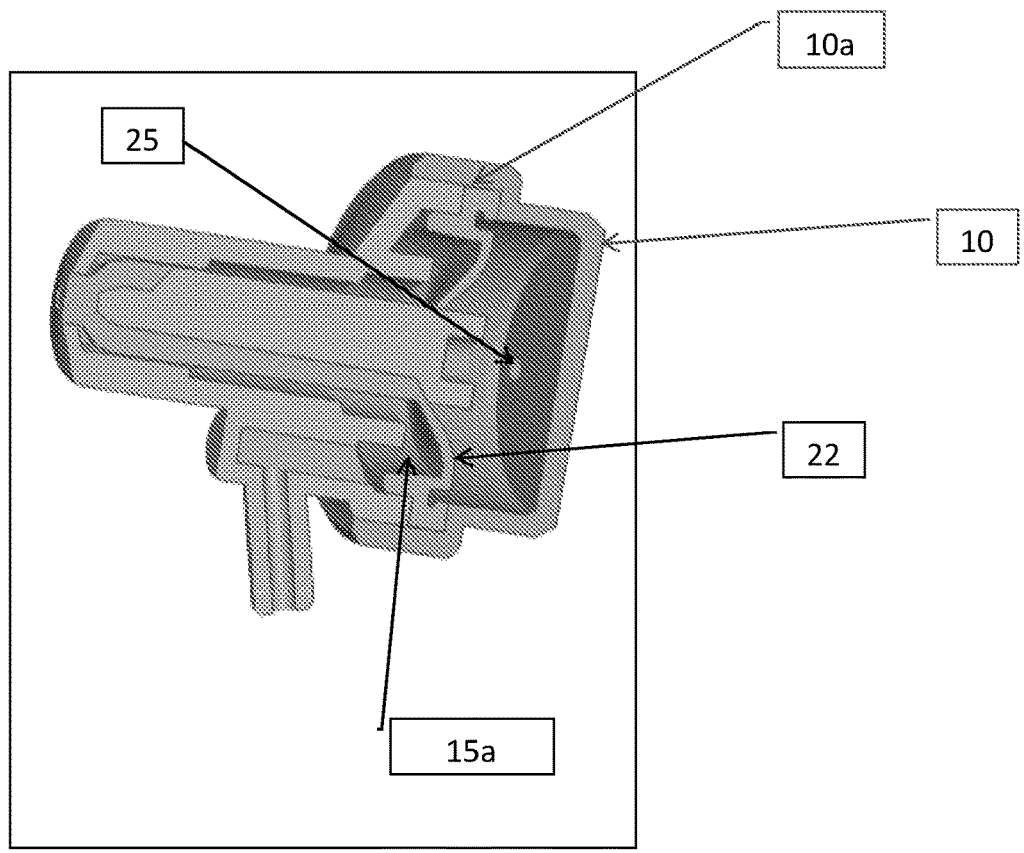
FIG. 9 is the same view as FIG. 7 but from a slight front perspective.

The attachment bell 10 makes it possible to ensure the sealed separation of the membrane 22 of the top valve 8 between the interior of the pump and the exterior. Like any bell, it has a base opening 10a opposite an end wall 10b. As depicted in FIG. 9, the membrane 22 thus seals closed, on one side, the cavity 15a in the outlet nozzle 9, and on the other side, the base opening 10a.

Figure 8:
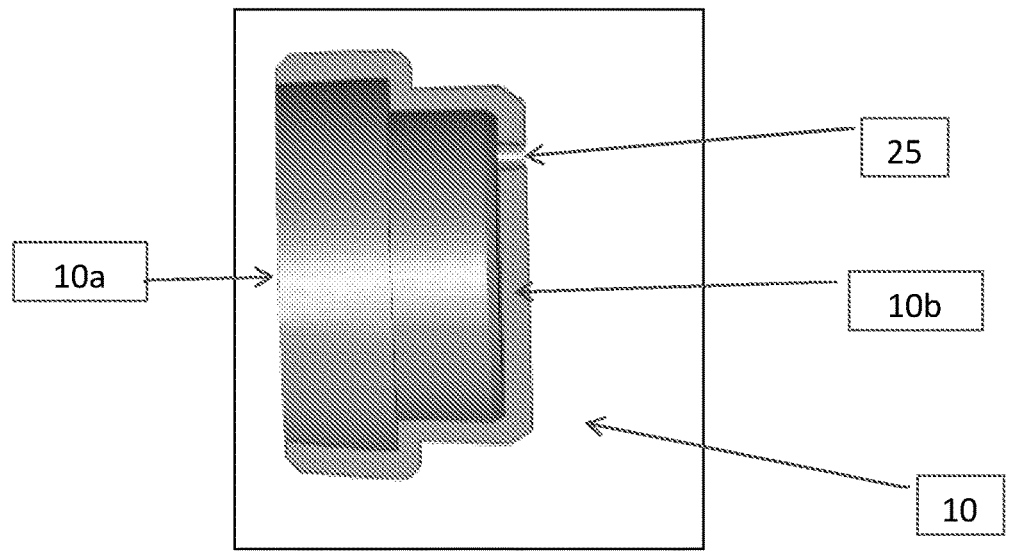
FIG. 8 is a sectional view of one of the elements isolated from FIG. 7, in this case the bell, but in a transverse plane, orthogonal to the sectional plane of FIG. 7 and passing through a longitudinal axis of the shut-off member.

As depicted in FIGS. 8 and 9, the end wall 10b of the bell 10 incorporates a vent hole 25 or vent, which makes it possible to avoid overpressures inside the attachment bell 10 when the membrane 22 of the top valve 8 retracts under the pressure of the cream.

FIGS. 10 to 13 depict the stages of operation of a dispensing device according to a second exemplary embodiment of the disclosure, comprising a closure device according to a second exemplary embodiment of the disclosure.

This second example differs essentially by the shape of the bell 10 and the attachment of the latter to the outlet nozzle 9. For the rest, the first and second exemplary embodiments are very similar and will not be described in further detail. The same references are also used.

In the first exemplary embodiment, the end wall 10b of the bell 10 is essentially flat, with the vent offset, while in the second example, the end wall is domed, the vent 25 being centered on the end wall. These shapes are not limiting.

Figure 10:
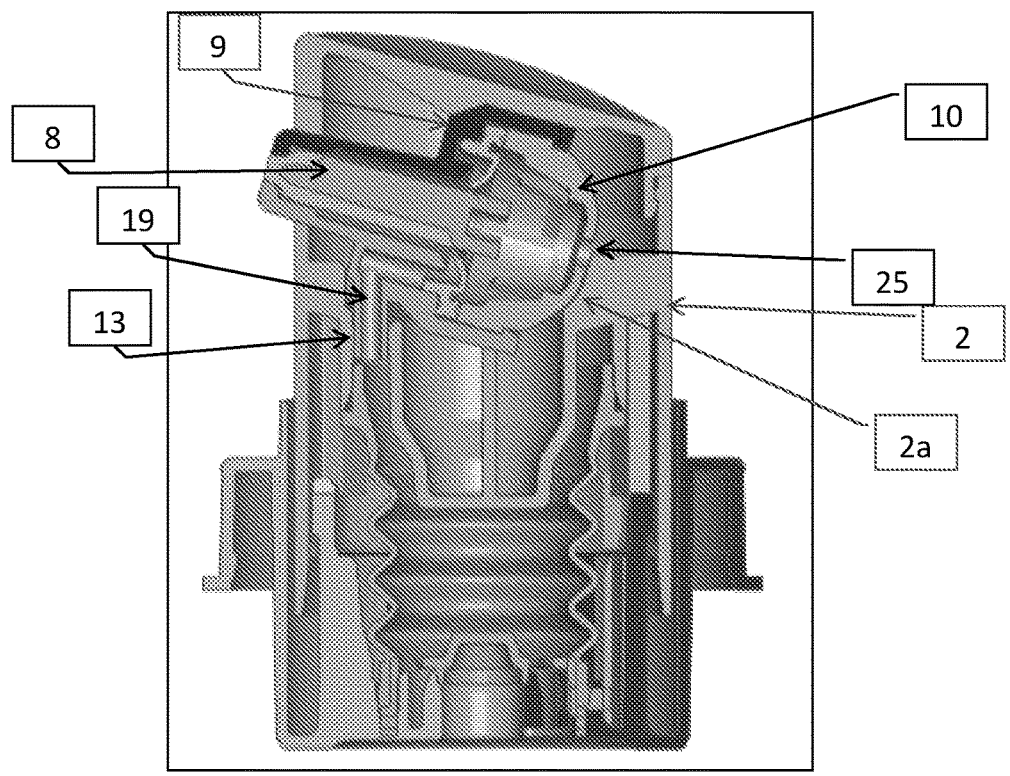
FIGS. 10 to 13 depict the operation of a dispensing device according to a second exemplary embodiment of the disclosure.

As can be seen in FIG. 10, the push button 2 comprises a housing 2a open at the top and having a shape complementary to the rear of the bell 10, making it possible to position the bell therein by placing the closure device in the housing from above. This complementary shape is therefore rounded, in this example.

In the first exemplary embodiment, the rear of the nozzle 9 forms a cylindrical sleeve press-fitted in the bell 10, via the base opening 10a, whereas in the exemplary embodiment of FIGS. 10 to 13, the edges of the central opening in the bell 10 are snap-fitted inside a cylindrical sleeve formed by the rear of the nozzle 9. In general, these attachment principles allow the membrane 22 to be clamped tightly and are simple. However, they are not limiting. The rear of the nozzle and the bell may therefore be assembled to one another by press-fitting, screwing or snap-fitting.

Even if this is only depicted in the second example, according to the disclosure, the connection tube 19 may be inserted into the connection channel 13, in particular in a sealed manner. The connection tube 19 may therefore also serve as a means for positioning from above. The housing and generally the push button may also include other positioning means.

The mode of operation is therefore depicted in FIGS. 10 to 13 for the second exemplary embodiment but may be transposed to the first exemplary embodiment.

The dispensing device is shown in FIG. 10 in the closed position. In this position, at rest, the push button 2 is raised and the top valve 8 is in the closed position.

Figure 11:
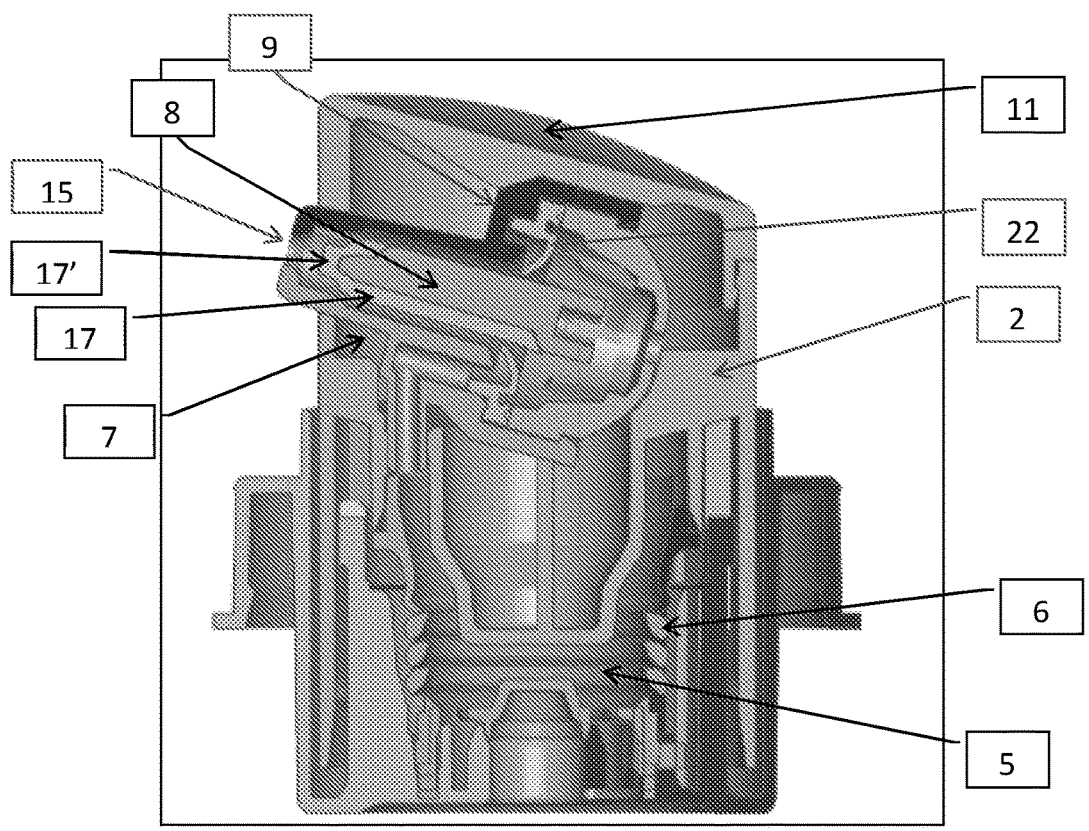

When the dispensing system is actuated, as in FIG. 11, by pressing on the covering cap 11 of the push button, the assembly made up of the covering cap 11, push button 2 and closure system 7, and the side walls of the bellows 6, are compressed. During this operation, the product contained in the metering chamber 5 is compressed by the reduction in volume of the bellows 6 and creates a pressure on the flexible membrane 22 of the top valve 8, which then deforms elastically and allows the shut-off member 17 to retract, and hence to open the outlet hole 15 in the nozzle 9, which is also the outlet hole for the closure device 7 and the dispensing device. This allows the product to exit through the outlet hole 15. The compressed product can only exit through the top valve 8, the bottom valve 4 being in the closed position, following the pressure in the metering chamber 5. When the shut-off member 17 is retracted as far as possible, it is as in FIG. 2, in the retracted position.

Figure 12:
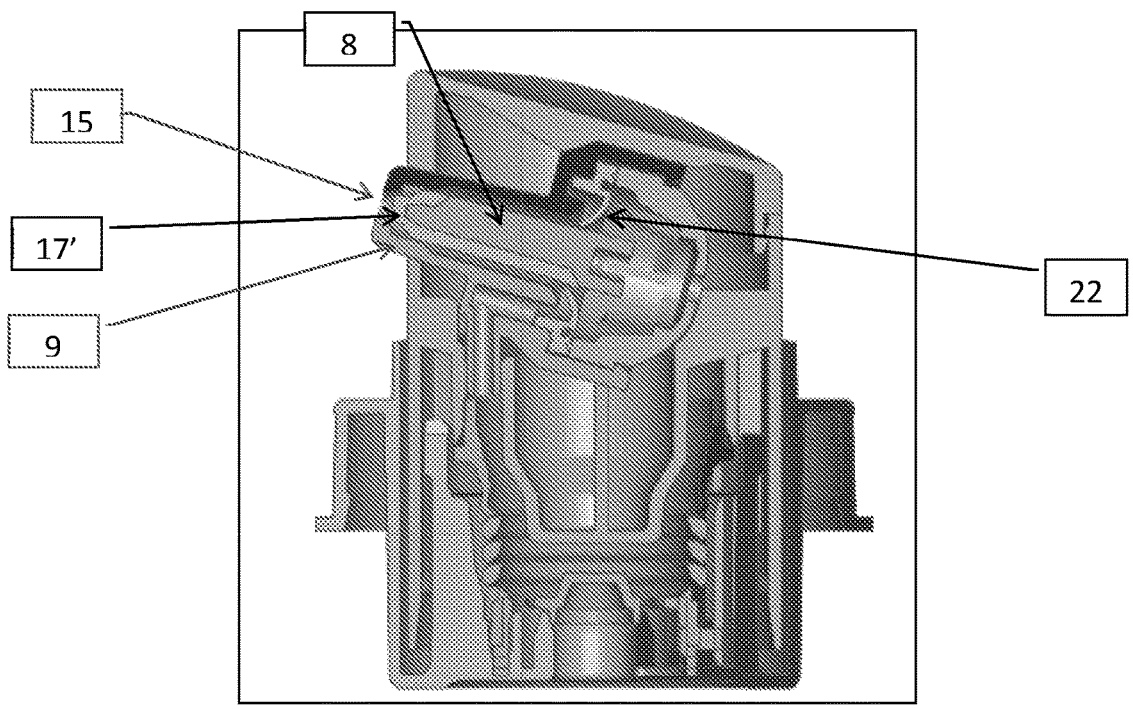

At the end of the actuation, when the push button 2 is in the bottom position, as depicted in FIG. 12, there is no longer an overpressure in the metering chamber 5, the pressure equalizes on either side of the membrane 22 of the top valve 8, the membrane 22, which was elastically deformed under the effect of the pressure, returns to its initial position and pushes the top valve 8 forward, and therefore into its forward position, thus closing off the outlet hole 15 in the outlet nozzle 9 via the nipple at the end 17 of the top valve 8, which comes into contact with the periphery of the outlet hole 15.

Figure 13:
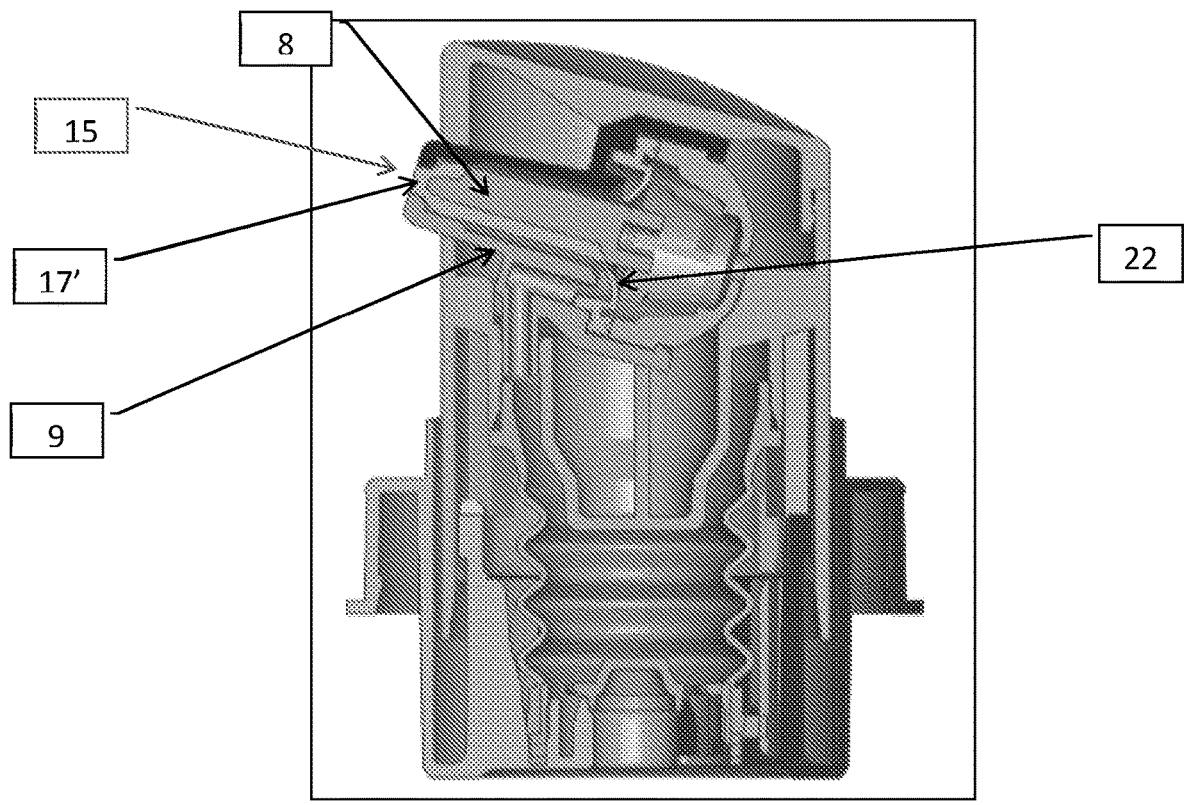

When the push button 2 rises, as depicted in FIG. 13, under the effect of the return force generated by the side walls of the bellows 6, the push button 2 rises. The metering chamber 5 then sees its volume increase and thus creates a depression inside the pump 1, and hence in the cavity 9a in the nozzle 9. This depression acts on the membrane 22 of the top valve 8 to make the top valve 8 move further forward and cause the flexible end 17 of the top valve 8 to enter the outlet hole 15 in the nozzle 9, the shut-off member then being in its forward position.

In this case, the end 17 of the top valve 8, which is made of flexible material such as TPE (thermoplastic elastomer) with a shore A hardness of between 30 and 90, comprises a nipple which is thus compressed radially when it enters the outlet hole 15, thus making it possible to reinforce the sealing of the closure system 7, with respect to contaminants of chemical origin or of bacterial origin.

The use of the depression which acts on the membrane 22 to force the end 17 of the top valve 8 to forcibly enter the outlet hole 15 in the nozzle 9 avoids having to use a powerful elastic return means to perform this operation. This also enables the top valve 8 to open more easily, since it will not have to counter the force of the powerful elastic return means.

In this case, as in general according to the disclosure, the closure device may therefore be without return means other than the membrane, in particular without elastic return means other than the membrane, such as a spring, for example a coil spring.

In addition, the forcible entry of the nipple 17' of the top valve in the outlet hole 15 in the nozzle 9 makes it possible to reduce as much as possible, or even to eliminate, the dead volumes associated with the hole, and to have the nipple 17' flush with the exterior of the outlet hole 15 in the nozzle, thus avoiding the stagnation of cream outside the closure system 7.

At the same time, the depression generated in the metering chamber 5 opens the bottom valve 4 which allows the cream to fill the metering chamber 5 and to lower the depression inside the dispensing device. The pump is thus ready to operate for a new product dispensing cycle.

Figure 14:
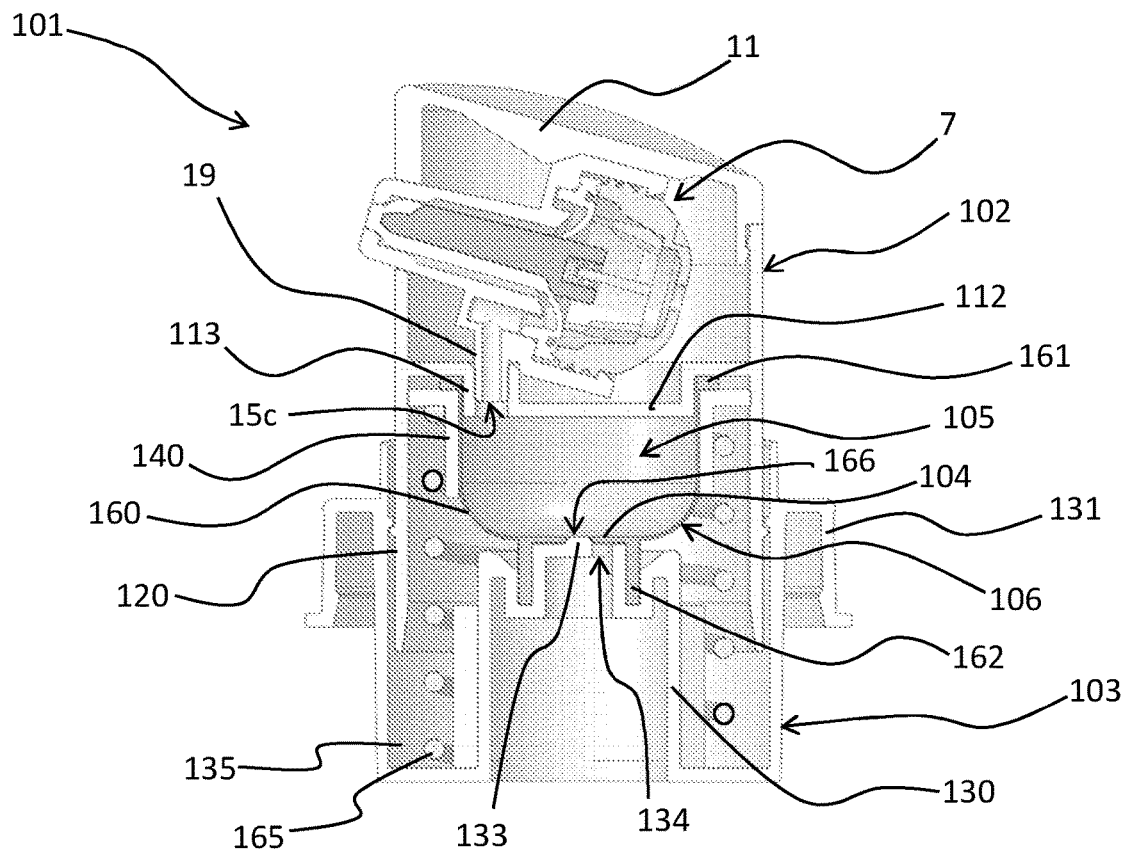
FIGS. 14 and 15 show a vertical sectional view of a dispensing device according to a third exemplary embodiment, in the expanded position and in the compressed position, respectively.
Figure 15:
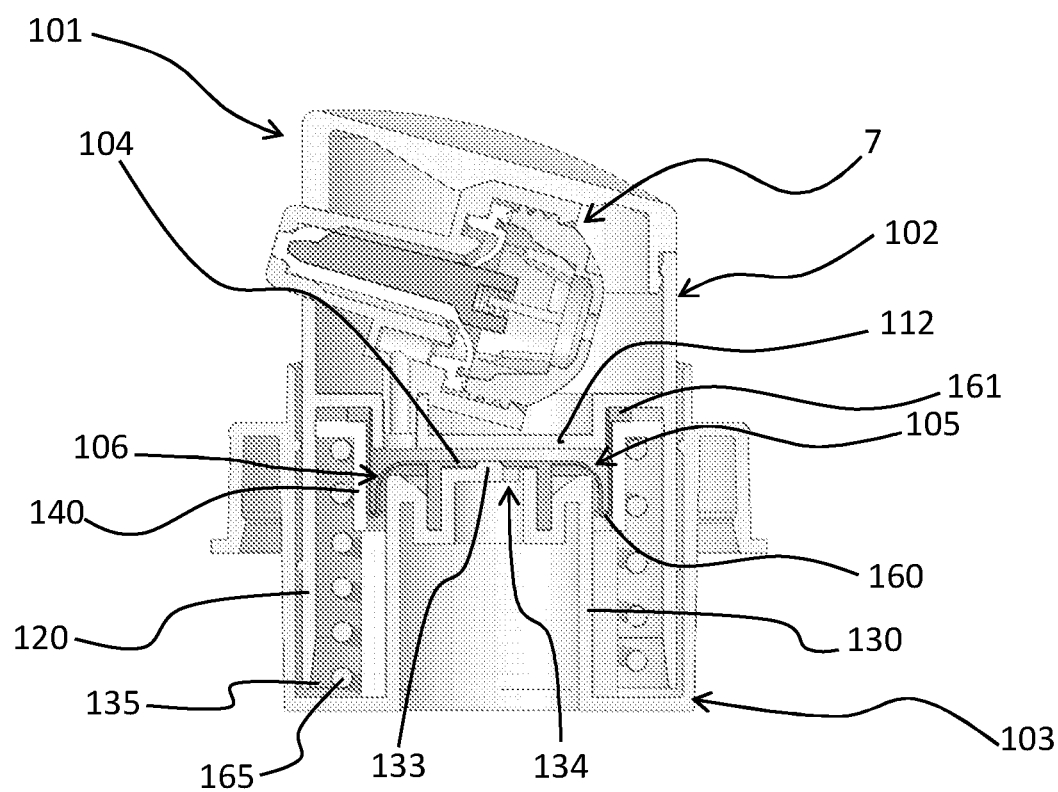

FIGS. 14 and 15 depict a third exemplary embodiment of a dispensing device according to the disclosure, in this case the pump 101.

In this mode, the closure device 7 is identical to that used in the example of FIGS. 10 to 13. It will therefore not be described in further detail. The cap 11 and the top of the push button 102 are also identical and enclose between them the closure device 7.

In this case, the metering chamber 105 is, as in the previous example, also delimited laterally by flexible side walls 160, collapsing on itself and thus reducing the volume of the metering chamber 105 in order to expel the fluid it contains. However, instead of being delimited by a bellows 6, the metering chamber 105 is in this third example delimited by a flexible pouch 106.

In this third exemplary embodiment, the pump 101 also comprises a connecting member 103 for connection to a container of liquid-to-pasty product, not shown, in particular by virtue of a connection groove 131 which snap-fits in a sealed manner onto the neck of the container.

The push button 102 can move relative to the connecting member 103 between a bottom position, depicted in FIG. 15, and a top position, depicted in FIG. 14.

According to the disclosure, as in this case, the connecting member 103 may form a piston, in particular a central piston, which extends to a level below the level of the connection groove 131. The interior of the piston 130 thus forms a suction channel for the product in the container. The exterior of the piston forms an upwardly projecting protrusion in the connecting member.

Around this piston 130, the connecting member 103 forms an upwardly oriented sliding groove 135 inside which the skirt 120 of the push button 102 slides.

The piston 130 comprises an upper face having a top opening 134 opening onto the bottom in the suction channel.

A flexible pouch 106 is arranged in the pump 101 in the space delimited between the skirt 120 and the external wall of the connection groove 131. This pouch 106 is attached at the top to the push button 102 and at the bottom to the piston 130.

The pouch 106 in this case has a simple shape.

This pouch 106 has an end wall pierced with an inlet orifice 166. This end wall is arranged to press against a portion of the upper surface of the piston 130, as well as against the top opening 134 in the latter, when the pressure increases in the metering chamber 105, i.e. when a fluid contained in the latter is discharged towards the closure device 7. This fluid is air when the pump 1 is primed and product once the pump 1 has been primed.

The upper face of the piston 130 has a nipple 133 offset with respect to the top opening 134, and arranged to forcibly enter the inlet orifice 166 when the end wall is pressed against the upper face of the piston 130, thus sealing closed the inlet orifice 166.

The pouch 106, and hence in this case the metering chamber 105, are closed at the top by a wall 112 of the push button 102, above which the closure device 7 is housed.

The connection tube 19 of the latter is housed in a connection channel 113 in this wall 112, which opens into the metering chamber 105 by a metering outlet communicating directly with the intake hole 15c in the closure device 7.

As depicted in FIG. 14, when the push button 102 is in the top position, the pouch 106 is arranged above the piston 130.

When the push button 102 descends to the bottom position, the pouch 106 collapses on the piston 130, turning in on itself, its side walls 160 then furling around the piston 130, as can be seen in FIG. 15.

This collapse results in a decrease in the volume of the metering chamber 105, and thus an increase in pressure in the latter, causing the product to be discharged out of the metering chamber 105 through the intake hole 15c, thus causing the opening of the closure device 7, and hence the dispensing of the product out of the pump 101.

The pump motor therefore comprises the connecting member 103, the pouch 106, the push button 102, the closure device 7 and the cap 11. It also comprises an elastic return means, formed in this case by a coil spring 165, which compresses when the push button 102 descends.

Then, the spring 165 returns the push button 102 to the top position, and the latter brings the top of the pouch 106 with it as it travels. The pouch 106 thus unfurls and expands above the piston 130, causing a decrease in pressure in the metering chamber 105, and therefore a suction.

Upon this decrease in pressure, as in the previous example, the closure device closes. By contrast, the bottom valve 104 opens, sucking product into the metering chamber 105.

In this third exemplary embodiment, the suction causes the end wall of the pouch 106 to move away from the top of the piston 130. The inlet orifice 166 is thus disengaged from the nipple 133. Furthermore, a passage is formed between the end wall of the pouch 106 and the portion of the upper face of the piston 130 against which this end wall was pressed. This passage communicates between the top opening 134 and the inlet orifice 166. Thus, the product can be sucked into the flexible pouch 106.

Therefore, in general in this third exemplary embodiment, the pouch 106 may form both the end wall and the collapsing walls 160 of the metering chamber, thus forming the metering chamber with a variable volume, and also forming the bottom valve 104.

The flexible pouch 106 may in particular be made of flexible material such as TPE with a shore A hardness of between 30 and 90.

In this case, the inlet orifice 166 and the nipple 133 are centered with respect to the end wall of the pouch 106 and the piston 130, respectively. The top opening 134 is off-center.

The pouch 106 may be attached in various ways.

According to the disclosure as in this case, the pouch 106 is open at the top, and comprises a neck 161 delimiting the upper opening in the pouch 106. The neck 161 is pinched between the wall 112 of the push button 102 and an attachment ring 140, this wall forming the ceiling of the metering chamber 105. In addition to a simplified assembly of the flexible pouch 106, the edge of this neck 161 thus forms the leaktight seal between the top of the pouch 106 and the wall 112. With a simple part, an additional function is thus performed.

According to the disclosure as in this case, the pouch 106 may comprise an attachment sleeve 162 projecting from the end wall of this pouch and outside of the volume defining the metering chamber 105. The attachment sleeve 162 is press-fitted into a circular top groove in the piston surrounding the nipple 133 and the top opening 134. Alternatively, the attachment sleeve 162 may be overmolded into this top groove.

The top groove is in this case centered on the nipple 133.

The attachment ring 140 may include a descending wall serving as a guide for the side walls 160 of the pouch 106, when they collapse.

This descending wall may, as in this case, have a diameter such that it has a clearance with respect to the piston 130, so as to descend around the piston during the discharge and such that the side walls 160 furl on themselves between this descending wall and the piston 130, as can be seen in FIG. 15. This improves guidance.

The turns of the spring 165 are in this case arranged around the piston and this descending wall, and hence around the pouch 106.

In the examples shown, the pump 1, once primed, delivers a dose of 1.5 ml of products when the push button 2, 102 passes from its top position to its bottom position.

In general, according to the disclosure, the closure device 7 and the dispensing device 1, 101 may have one or more of the following features and functionalities:
the closure device is composed, in particular only, of an assembly of three parts assembled on the pump;
the top valve has at its end a flexible nipple which enters the outlet hole in the nozzle;
the top valve is bi-injection molded with a first injection of rigid material such as PP for the skeleton and a second injection of flexible material such as TPE for the membrane and the end nipple;
the membrane of the top valve has a large surface area so as to be able to operate at low pressures, i.e. at less than 2 bar, and in particular at pressures less than 0.4 bar;
the closure device is assembled via the top of the push button;
the bell for attaching the top valve has a vent so that there is atmospheric pressure inside the bell, the internal volume of which is in contact with the side of the membrane opposite the side of the membrane facing the nozzle;
the forcible entry of the nipple of the top valve in the outlet hole of the nozzle makes it possible to reduce as much as possible, or even to eliminate, the dead volumes associated with the outlet hole and to have the nipple flush with the exterior of the nozzle outlet hole, thus avoiding the stagnation of cream outside the closure system;
a function of sealing, at the nipple at the end of the top valve, with the outlet hole in the nozzle;
a function of sealing, at the flexible membrane of the top valve, between the nozzle and the bell, in particular between the stop of the outlet nozzle and between the stop of the attachment bell;
a function of elastic deformation and elastic return, at the flexible membrane, when its surface is stressed by pressure differences on either side of the flexible membrane.

The invention claimed is:

1. A closure device intended to be mounted in a device for dispensing a liquid-to-pasty product to be dispensed, said closure device forming a module comprising:
an outlet nozzle comprising a cavity and outer walls delimiting the cavity, these outer walls having several through-holes and through-openings: an outlet hole at the front of the nozzle, a rear opening, and an intake hole intended to be connected to a metering chamber of a pump motor of the dispensing device,
a top valve comprising:
a shut-off member, arranged inside the cavity and movable between a forward position in which the shut-off member closes off the outlet hole and a retracted position in which the shut-off member uncovers this outlet hole,
a deformable membrane which closes the rear opening in a sealed manner and which is rigidly secured to the shut-off member, and
a rigid skeleton extending between a first end closing off the outlet hole in said forward position and a second end bearing the membrane,
a bell having an end wall and a base opening opposite the end wall, the edges of the base opening being attached to the nozzle, the membrane also closing the base opening in a sealed manner,
wherein the membrane having flexibility and the closure device being arranged in such a way that a depression inside the cavity causes deformation of the membrane toward the interior of the cavity, so that the membrane then pushes the shut-off member into said forward position,
wherein the top valve comprises a flexible coating bi-injection molded on the skeleton, the coating covering a first end of the skeleton so as to form a nipple and extending to the second end of the skeleton, forming the membrane substantially transversely to the longitudinal axis of the skeleton,
wherein the coating extends to the second end of the skeleton, forming a cup substantially transverse to the longitudinal axis of the skeleton, the cup forming the membrane,
wherein the membrane is elastic so as to generate, when the membrane deforms, an elastic return force at the flexible membrane, when a surface is stressed by differences in pressure on either side of the membrane.

2. The closure device as claimed in claim 1, wherein the edges of the base opening are attached to the nozzle in such a way that the bell and the nozzle grip the edges of the membrane tightly.

3. The closure device as claimed in claim 1, wherein the membrane is made of a flexible material bi-injection molded on said skeleton.

4. The closure device as claimed in claim 1, wherein the shut-off member is arranged so as to forcibly enter the outlet hole when the membrane pushes the shut-off member into said forward position.

5. The closure device as claimed in claim 4, wherein the shut-off member has a radially compressible flexible end.

6. The closure device as claimed in claim 1, wherein the bell also has at least one vent communicating between the interior and the exterior of the bell.

7. A device for dispensing a liquid-to-pasty product, comprising:
- a pump motor with a metering chamber,
- a bottom valve for opening or closing the inlet to the metering chamber,
- a housing,
- a closure device according to claim 1, housed in the housing, and arranged in such a way that the intake hole is in communication with the interior of the metering chamber.

8. The dispensing device as claimed in claim 7, in which the housing is open at the top so that the closure device is mounted from above in the housing.

9. The dispensing device as claimed in claim 7, comprising a connecting member for connection to a container of liquid-to-pasty product, and in which the pump motor further comprises:
- a push button that can move relative to the connecting member between a bottom position and a top position,
- a piston fixed relative to the connecting member, the piston comprising a top opening communicating on one side with the interior of the metering chamber and being intended on the other side to be in communication with the contents of the container,
- a flexible pouch delimiting the metering chamber laterally, attached at the top to the push button and at the bottom to the piston,
- an elastic return means arranged in such a way that a stress increases when the push button moves into the bottom position, the flexible pouch and the piston being arranged in such a way that when the push button is in the top position, the flexible pouch is arranged above the piston, in such a way that when the push button descends to the bottom position, the flexible pouch collapses on the piston, causing an increase in pressure in the metering chamber, and in such a way that when the push button rises to the top position, the flexible pouch expands above the piston, causing a decrease in pressure in the metering chamber, the bottom valve being arranged in such a way as to open or close the top opening under the effect of a decrease in pressure or an increase in pressure, respectively, in the metering chamber.

10. The dispensing device as claimed in claim 9, in which the flexible pouch is arranged to collapse while turning inward, side walls then furling around the piston.

11. The dispensing device as claimed in claim 9, in which the flexible pouch and the bottom valve form a single one-piece part made of a single material.

\* \* \* \* \*